United States Patent [19]

Kobunaya et al.

[11] Patent Number: 5,617,382

[45] Date of Patent: Apr. 1, 1997

[54] OPTICAL INFORMATION ACCESSING SYSTEM CAPABLE OF RELIABLE JUMP-BACK CONTROL

[75] Inventors: Hideki Kobunaya, Tokyo; Yutaka Ishikawa; Yoshimori Yamasaki, both of Kanagawa; Takayoshi Chiba, Tokyo, all of Japan

[73] Assignees: NEC Corporation; Sony Corporation, both of Japan

[21] Appl. No.: 394,387

[22] Filed: Feb. 24, 1995

[30] Foreign Application Priority Data

Feb. 24, 1994 [JP] Japan ................................. 6-053179

[51] Int. Cl.⁶ .................................................. G11B 7/00
[52] U.S. Cl. ...................... 369/32; 369/44.28; 369/44.32
[58] Field of Search ................................ 369/32, 48, 50, 369/44.27, 44.28, 44.29, 44.32; 360/78.1

[56] References Cited

U.S. PATENT DOCUMENTS 4,525,840  6/1985  Heinz et al. ............................ 360/51
4,910,722  3/1990  Kaji et al. ............................... 369/32
5,220,545  6/1993  Tomimitsu ............................. 369/32
5,485,441  1/1996  Maeda .................................. 369/111

FOREIGN PATENT DOCUMENTS 60-115069  6/1985  Japan .

*Primary Examiner*—Nabil Hindi

[57] ABSTRACT

In an optical information accessing system for an optical disc including a plurality of tracks forming one helix, a counter counts sectors, and a comparator compares a value of the counter with a predetermined value. When the value of the counter reaches the predetermined value, a coincidence signal is generated from the comparator. A gate circuit passes the coincidence signal as a jump-back signal. When data processing upon the optical disc is abnormally interrupted and the coincidence signal is generated, the predetermined value is switched from a first value to a second value larger than the first value.

13 Claims, 18 Drawing Sheets

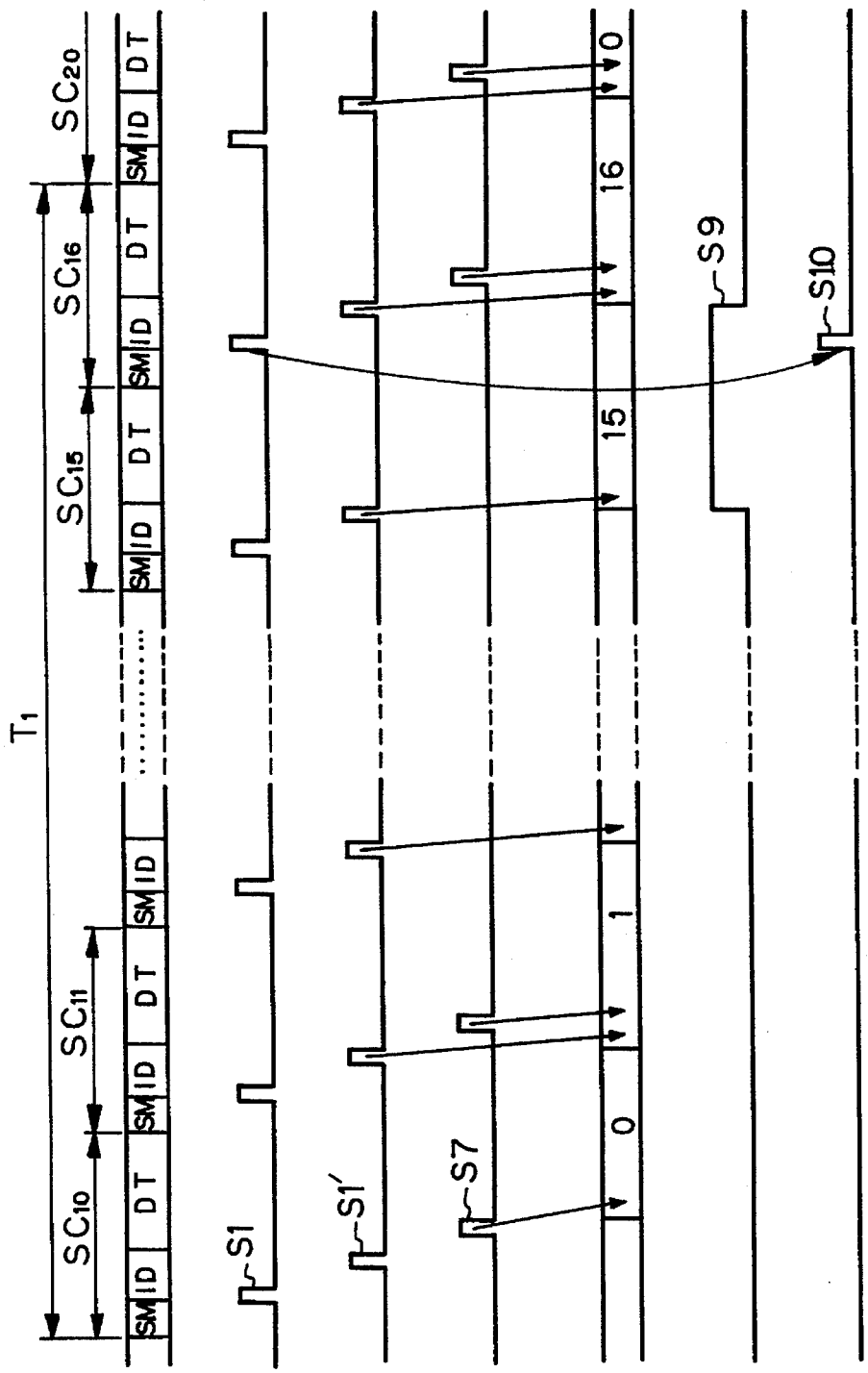

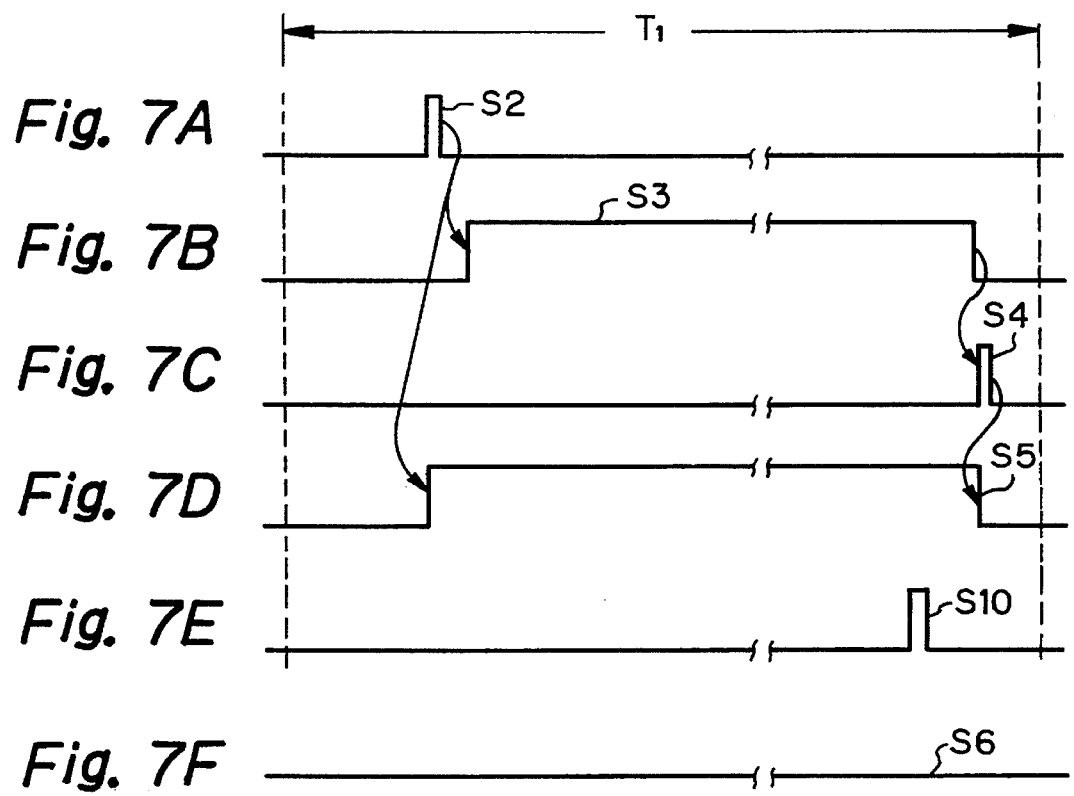

ABNORMAL PROCESSING (I)

ABNORMAL PROCESSING (II)
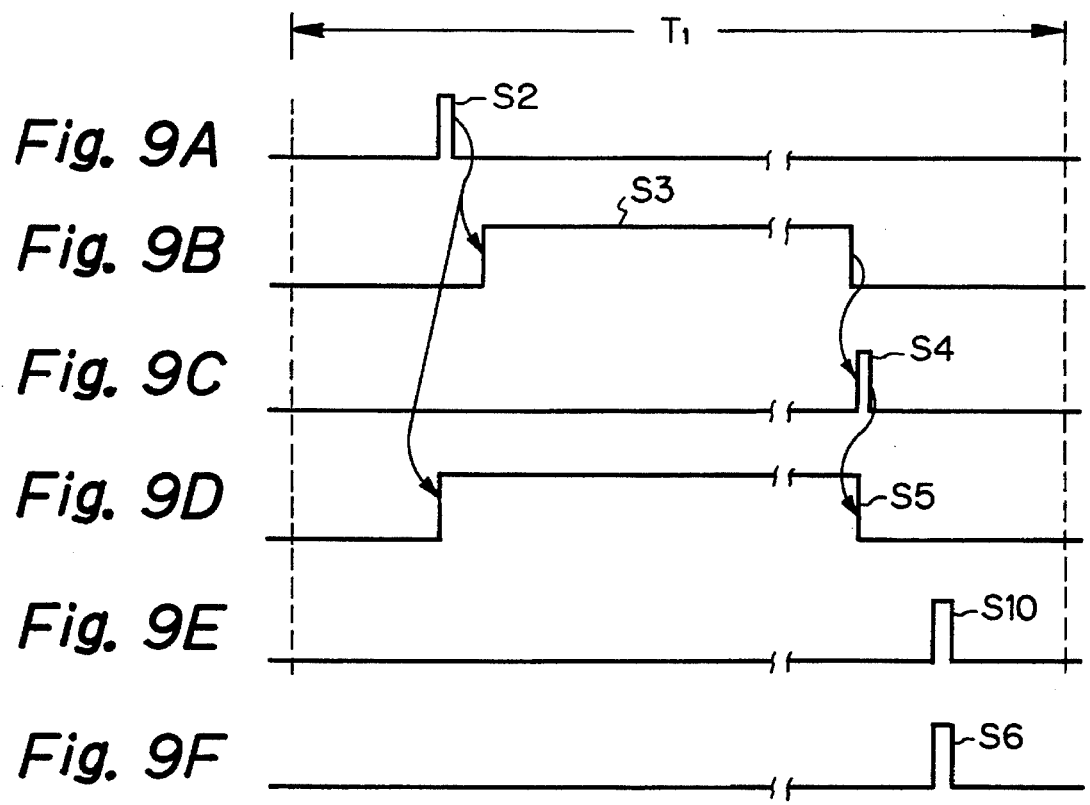

ABNORMAL PROCESSING (III)
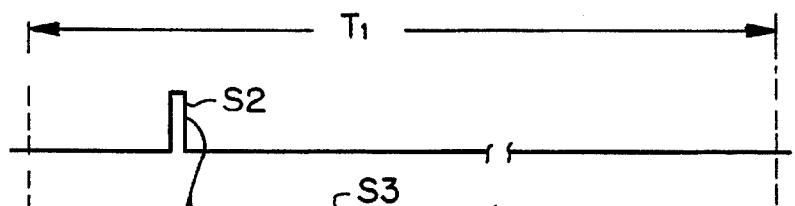
Fig.10A
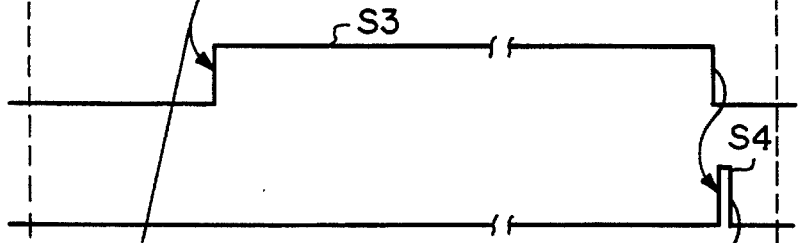
Fig.10B
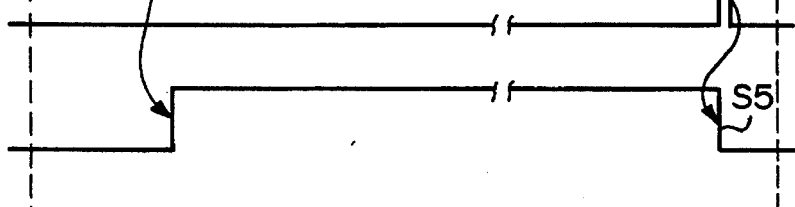
Fig.10C
Fig.10D
Fig.10E
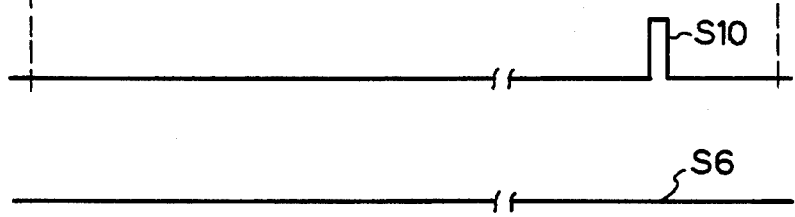
Fig.10F

OPTICAL INFORMATION ACCESSING SYSTEM CAPABLE OF RELIABLE JUMP-BACK CONTROL

BACKGROUND OF THE INVENTION

1. Field of the Invention

The present invention relates to an optical information accessing system for a disc-type recording medium such as an optical disc including a plurality of tracks forming one helix, and more particularly, to the improvement of a jump-back control of the optical information accessing system.

2. Description of the Related Art

In an optical disc having a plurality of tracks forming one helix, an optical head traces the helix. In this case, when data processing upon one of the tracks is abnormally interrupted, it is necessary for the optical head to retrace the same track. In other words, after the optical disc is rotated one revolution, the optical head is required to jump-back to the same track. This is called a jump-back operation.

In a prior art optical information accessing system, any jump-back operation is carried out at a special sector of each of the tracks. In this case, the special sectors are located at the same radius position of the optical disc. Therefore, when the data processing is incomplete for the special sector, a jump-back operation is carried out after another revolution of the optical disc, which may invite a jump-back operation for other tracks shifted from a track which requires such a jump-back operation.

SUMMARY OF THE INVENTION

It is an object of the present invention to enable a normal jump-back operation even after data processing upon an optical disc is abnormally interrupted for a special sector at which a jump-back operation may be carried out.

According to the present invention, in a optical information accessing system for an optical disc including a plurality of tracks forming one helix, a counter counts sectors, and a comparator compares a value of the counter with a predetermined value. When the value of the counter reaches the predetermined value, a coincidence signal is generated from the comparator. A gate circuit passes the coincidence signal as a jump-back signal. When data processing upon the optical disc is abnormally interrupted and the coincidence signal is generated, the predetermined value is switched from a first value to a second value larger than the first value.

Thus, even when data processing upon the optical disc is abnormally interrupted after time corresponding to the first value has passed, a jump-back signal is generated at time corresponding to the second value.

BRIEF DESCRIPTION OF THE DRAWINGS

The present invention will be more clearly understood from the description as set forth below, with reference to the accompanying drawings, wherein:

FIGS. 6A through 6G, 7A through 7F, 8A through 8F, 9A through 9F, and 10A through 10F are timing diagrams showing the operation of the jump-back generating circuit of FIG. 5;

DESCRIPTION OF THE PREFERRED EMBODIMENTS

Before the description of the preferred embodiments, an optical information accessing system relating to the present invention will be explained with reference to FIGS. 1, 2, 3, 4, 5A through 5G, 6A through 6G, 7A through 7G, 8A through 8G, 9A through 9G, 10A through 10F, 11 and 12.

Figure 1:
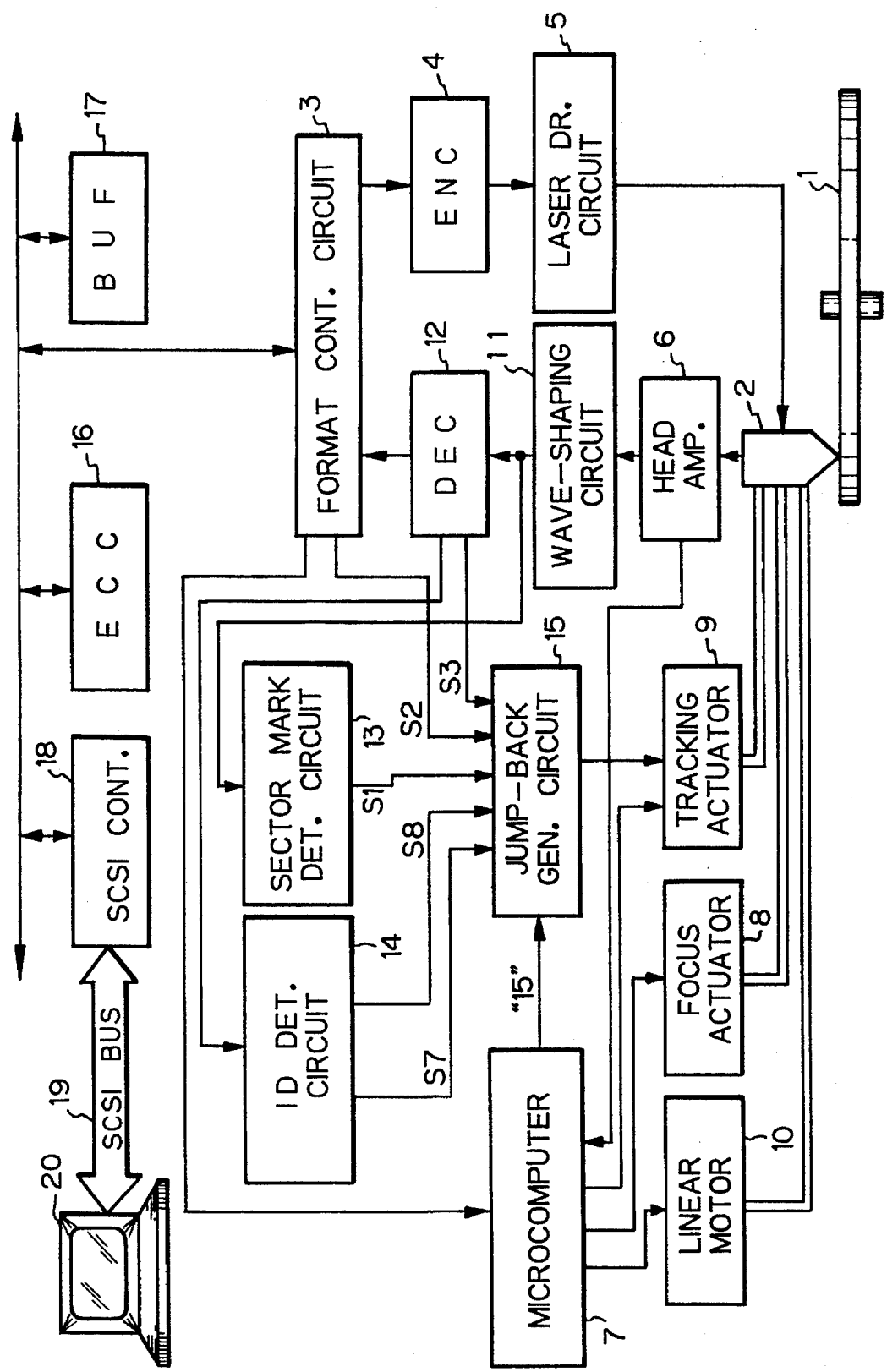
FIG. 1 is a block diagram illustrating an optical information accessing system relating to the present invention.

In FIG. 1, reference numeral 1 designates an optical disc having helical tracks, and 2 designates an optical head for accessing the optical disc 1. First, a servo system of the optical disc 1 is explained below. A format control circuit 3 operates an encoder 4 to drive a laser driving circuit 5, to emit laser light from the optical head 2 to the optical disc 1. As a result, laser light emitted from the optical head 2 is reflected by the optical disc 1, and is transmitted to a head amplifier 6 which converts the reflected light into an electrical signal. The electrical signal is supplied to a microcomputer 7 to detect a deviation of tracks on the optical disc 1. The deviation detected by the microcomputer 7 is supplied to a focus actuator 8 and a tracking actuator 9, to trace one of the tracks by the optical head 2. Also, the microcomputer 7 controls a linear motor 10, so that the optical head 2 is always right on one of the tracks.

A read system of the optical disc 1 is explained below. Data on the optical disc 1 is read by the optical head 2 and the head amplifier 6, and is supplied via a wave-shaping circuit 11 to a decoder 12. An output of the decoder 12 is supplied to the format control circuit 3.

Also, the output signal of the wave-shaping circuit 11 is supplied to a sector mark detection circuit 13 for detecting a sector mark.

The decoding output signals of the decoder 12 are supplied to the format control circuit 3, an identification code (ID) determination circuit 14 and a jump-back generating circuit 15. This jump-back generating circuit 15 receives signals from the format control circuit 3, the microcomputer 7, the sector mark detection circuit 13 and the ID determination circuit 14.

Data of a desired sector read by the format control circuit 3 checked and corrected by an error correction circuit (ECC) 16, and is then stored in a buffer 17. The data stored in the buffer 17 is transmitted by a small computer system interface (SCSI) controller 18 via an SCSI bus 19 to a host computer 20.

Figure 2:
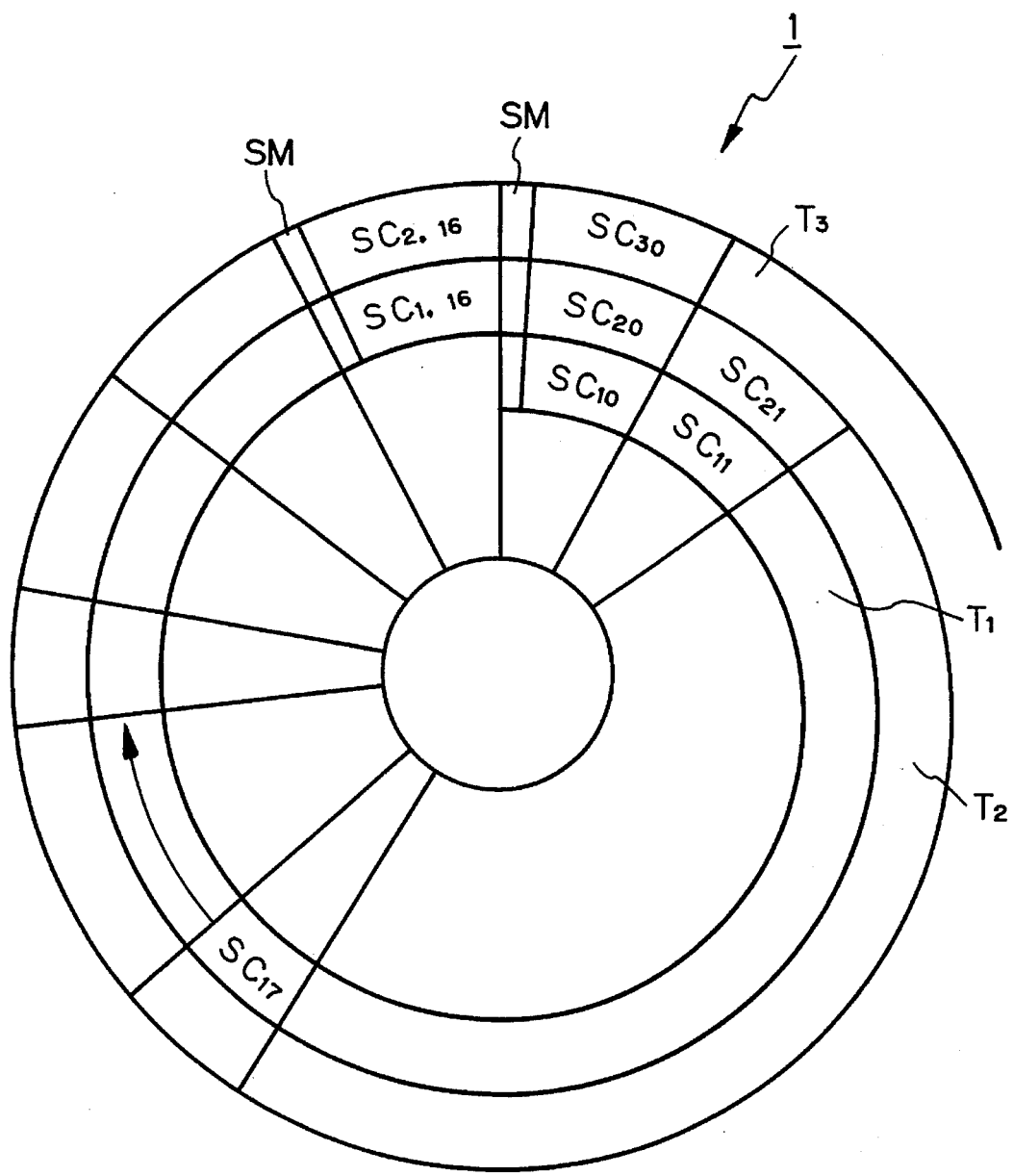
FIG. 2 is a diagram showing an example of the disc format of the optical disc of FIG. 1.

Since the optical disc 1 has a plurality of tracks $T_1, T_2, T_3, \ldots$ forming one helix as shown in FIG. 2, when the optical head 2 is expected to follow the same track, it is necessary to jump the optical head 2 back to the same track every one track revolution. For this purpose, the jump-back generating circuit 15 is connected to the tracking actuator 9. Note that each track, such as $T_1$, is divided into 17 sectors, such as $SC_{10}, SC_{11}, \ldots, SC_{1,16}$. Here, the sectors $SC_{10}, SC_{20}, \ldots$ are called first sectors, and the sectors $SC_{1,16}, SC_{2,16}, \ldots$ are called last sectors. Also, a sector mark SM is provided in a leading edge portion of each of the sectors.

Figure 3:
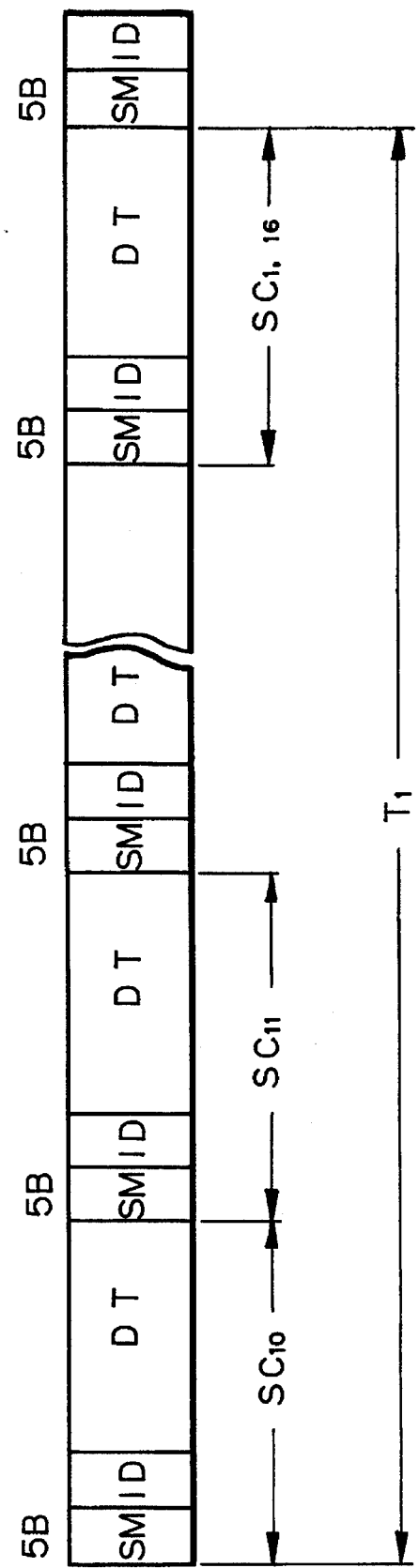
FIG. 3 is a diagram showing an example of the sector format of FIG. 2.
Figure 4:
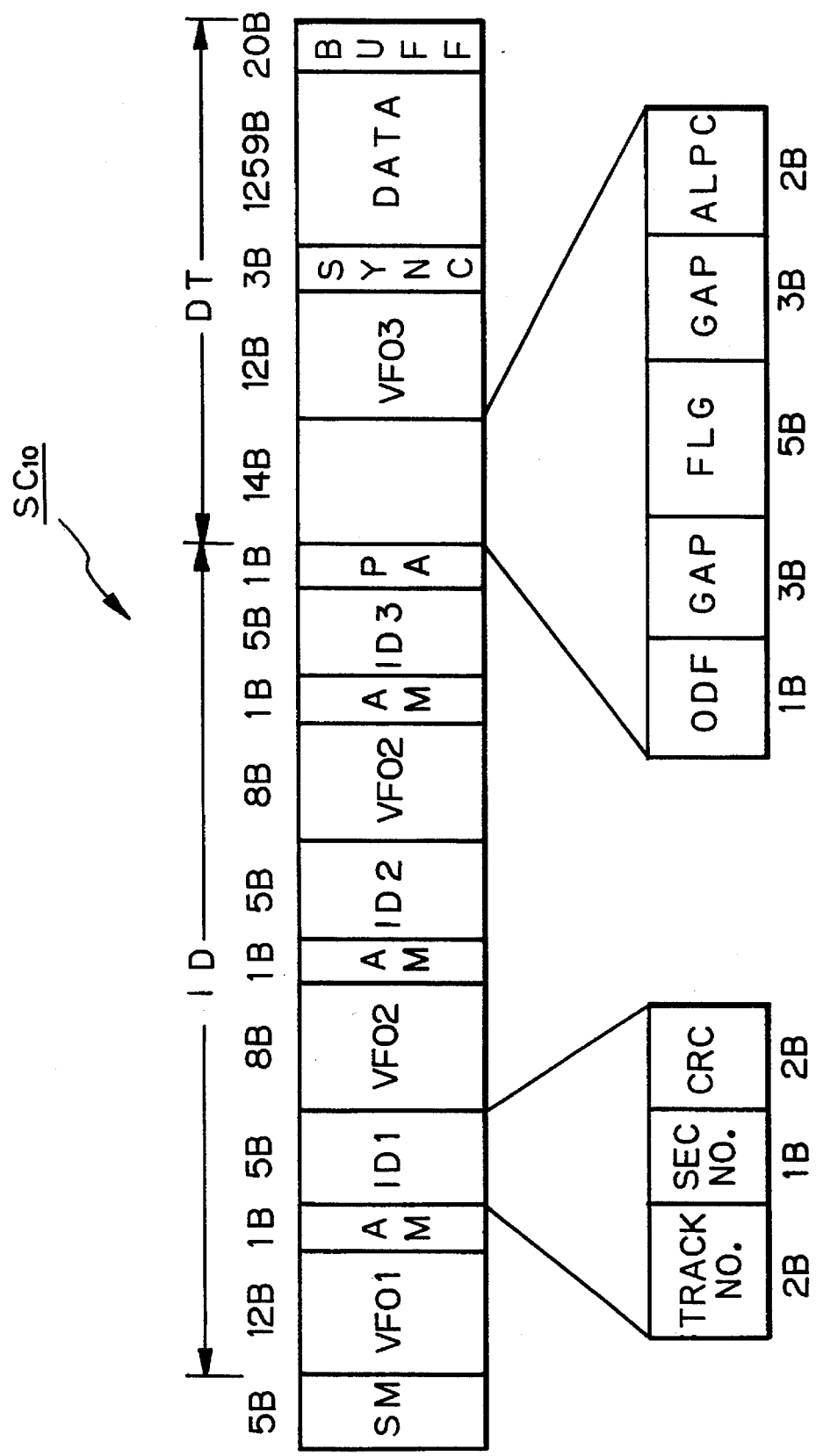
FIG. 4 is a detailed diagram of the sector format of FIG. 3.

In FIG. 3, which shows a sector format of the track, such as $T_1$, the track is constructed by a sector mark SM (5 bytes), an identification code area ID and a data area DT. In more detail, as shown in FIG. 4, the identification code area ID and the data area DT are comprised of a variable frequency oscillator (VFO) data VFO1 (12 bytes), two VFO data VFO2 (8 bytes), a VFO data VFO3 (12 bytes), three address marks AM (1 bytes), three ID data ID1, ID2 and ID3 (5 bytes), a postamble (1 byte), an offset detection flag ODF (1 byte) serving as a mirror portion for correcting an offset in the servo system, two gaps GAP (3 bytes), a flag FLG (5 bytes), an auto laser power control data ALPC (2 bytes) used in a laser power test, a synchronization data SYNC (3 bytes), a data area DATA (1259 bytes), and a buffer area BUFF (20 bytes) for a margin of rotation deviation of the optical disc 1. Each of the ID data ID1, ID2 and ID3 includes a track number (2 bytes), a sector number (1 byte) and a cyclic redundancy code (CRC) (2 bytes).

Note that the data VFO1, VFO2 and VFO3 are extracted by a phase-locked loop (PLL) circuit included in the wave-shaping circuit 11 to generate a data synchronization signal.

Figure 5:
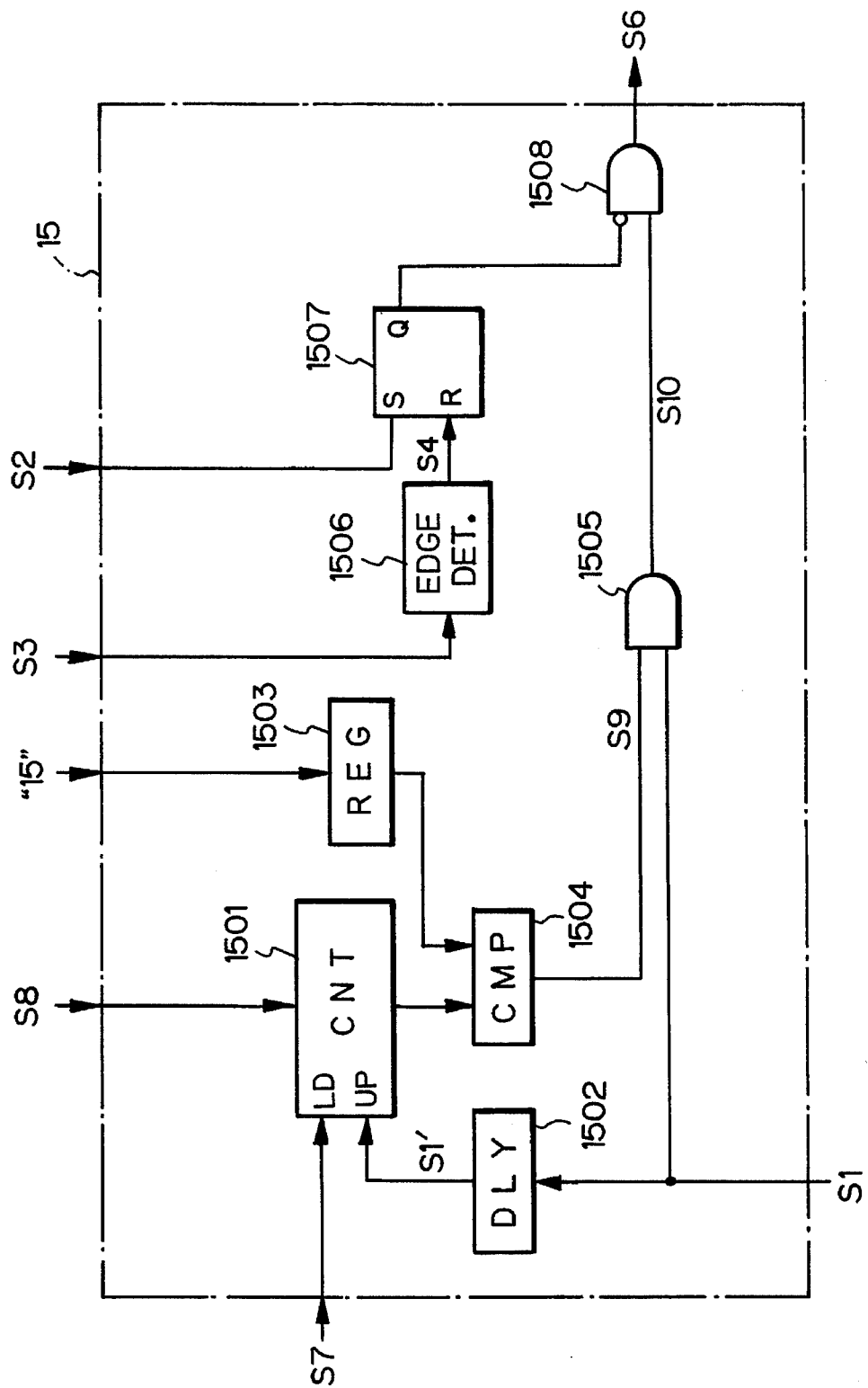
FIG. 5 is a detailed circuit diagram of the jump-back generating circuit of FIG. 1.

In FIG. 5, which is a detailed circuit diagram of the jump-back generating circuit 15 of FIG. 1, reference numeral 1501 designates a counter. A sector number signal S8 from the ID determination circuit 14 is loaded in the counter 1501 in response to an ID detection signal S7 from the ID determination circuit 14.

Also, reference numeral 1502 designates a delay circuit for delaying a sector mark detection signal S1 from the sector mark detection circuit 13 to generate a delayed sector mark detection signal S1'. The counter 1501 is counted up by +1 in response to the delayed sector mark detection signal S1'.

Reference numeral 1503 designates a register in which a definite value such as 15 is stored by the microcomputer 7. A comparator 1504 compares the value of the counter 1501 with the value "15". As a result, only when the value of the counter 1501 coincides with the value "15", does the comparator 1504 generate a coincidence signal S9 and transmits it to an AND circuit 1505 which also receives the sector mark detection signal S1.

Also, reference numeral 1506 designates a falling edge detection circuit for detecting a falling edge of a data processing signal S3 from the decoder 12. A flip-flop 1507 is set by a jump-back off signal S2 from the format control circuit 3, and is reset by a falling edge detection signal S4 of the falling edge detection circuit 1506.

A gate circuit 1508 is controlled by an output signal S5 to pass an output signal S10 of the AND circuit 1505 as a jump-back signal S6.

The output signal S10 of the AND circuit 1305 is generated as shown in FIGS. 6A through 6G. The ID area information read out of the tracks $T_1$ having sectors $SC_{10}, SC_{11}, \ldots$ as shown in FIG. 6A is supplied via the decoder 12 to the ID determination circuit 14 which determines whether or not the track number, the sector number and the like included in the ID area of each sector are correct. Only when the ID information included in each sector is correct, does the ID determination circuit 14 generate an ID detection signal S7 as shown in FIG. 6D. As a result, the counter 1501 loads the sector number signal S8 in response to the ID detection signal S7. On the other hand, the counter 1501 is counted up by the delayed sector mark detection signal S1' as shown in FIG. 6C. In any case, the current sector number is stored in the counter 1501 as shown in FIG. 6E. Therefore, when the value of the counter 1501 reaches the value "15" of the register 1505, the comparator 1504 generates a coincidence signal S9 as shown in FIG. 6F. As a result, when the sector mark detection circuit 13 generates a sector mark detection signal S1 as shown in FIG. 6B, the output signal S10 of the AND circuit 1505 is made high (="1").

Thus, the value "15", which is smaller by 1 than a sector number at which the jump-back signal S6 is expected, is set in the register 1503. As a result, the output signal S10 of the AND circuit 1505 is made active when reading the sector $SC_{16}$ having the sector number "16".

The generation of the jump-back signal S6 from the output signal S10 of the AND circuit 1505, which is controlled by the falling edge detection circuit 1506, the flip-flop 1507 and the gate circuit 1508, will be explained with reference to FIGS. 7A through 7F, FIGS. 8A through 8F, FIGS. 9A through 9F and FIGS. 10A through 10F.

FIGS. 7A through 7F show a normal data processing. In this case, assume that the host computer 20 has generated a data processing instruction signal initiated at the sector $SC_{17}$ of the track $T_1$. Then, the microcomputer 7 controls the linear motor 10, so that the optical head 2 seeks the track $T_1$. Next, the format control circuit 3 searches the sector number "7". As a result, when the optical head 2 arrives above the sector $SC_{17}$ of the track $T_1$, the format control circuit 3 initiates data processing from the sector $SC_{17}$, and therefore, jump-back control is unnecessary. Therefore, the format control circuit 3 generates a jump-back off signal S2 as shown in FIG. 7A. As a result, data processing is initiated, so that the data processing signal S3 of the decoder 12 rises as shown in FIG. 7B. Also, when the data processing is completed, the data processing signal S3 of the decoder 12 falls as shown in FIG. 7B. In this case, the falling edge of the data processing signal S3 is detected by the falling edge detection circuit 1506, so that its detection signal S4 is generated as shown in FIG. 7C. As a result, as shown in FIG. 7D, the output signal S5 of the flip-flop 1507 remains active (="1") from a time when the jump-back off signal S2 is generated to a time when the data processing signal S3 falls. Therefore, the output signal S10 of the AND circuit 1305 as shown in FIG. 7E is masked by the gate circuit 1508, so that the jump-back signal S6 is not generated as shown in FIG. 7F. Thus, a jump-back control is not carried out.

Figure 8A:
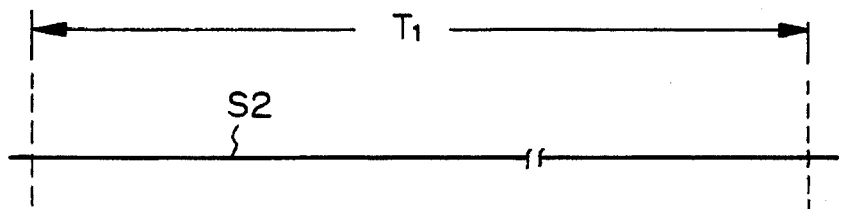
Figure 8B:
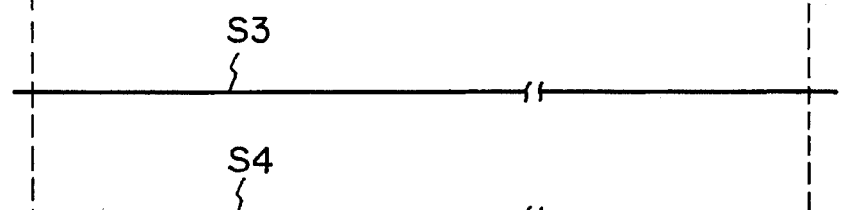
Figure 8C:
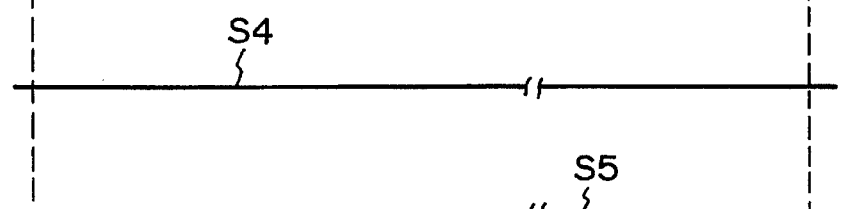
Figure 8D:
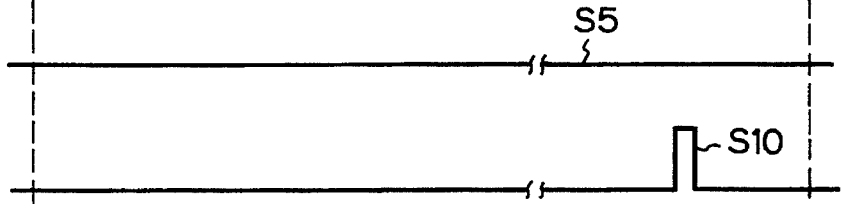
Figure 8E:
Figure 8F:

FIGS. 8A through 8F show an abnormal data processing. In this case, a desired sector cannot be accessed. Also, in this case, assume that the host computer 20 has generated a data processing instruction signal initiating at the sector $SC_{17}$ of the track $T_1$. Then, the microcomputer 7 controls the linear motor 10, so that the optical head 2 seeks the track $T_1$. Next, the format control circuit 3 searches the sector number "7". In this case, however, the optical head 2 cannot arrive above the sector $SC_{17}$ of the track $T_1$, and therefore, jump-back control is necessary. Therefore, the format control circuit 3 does not generate a jump-back off signal S2 as shown in FIG. 8A. Also, the data processing signal S3 of the decoder 12 neither rises nor falls as shown in FIG. 8B, and therefore, the output signal S4 of the falling edge detection circuit 1506 is not generated as shown in FIG. 8C. Thus, the output signal S5 of the flip-flop 1507 is never made active as shown in FIG. 8D. Therefore, the output signal S10 of the AND circuit 1505 as shown in FIG. 8E is not masked by the gate circuit 1508, so that the jump-back signal S6 is generated as shown in FIG. 8G. Thus, a jump-back control is carried out.

FIGS. 9A through 9F show an abnormal data processing. In this case, a desired sector is accessed, but the data processing is incomplete before the last sector. Also, in this case, assume that the host computer 20 has generated a data processing instruction signal initiated at the sector $SC_{17}$ of the track $T_1$. Then, the microcomputer 7 controls the linear motor 10, so that the optical head 2 seeks the track $T_1$. Next, the format control circuit 3 searches the sector number "7". As a result, when the optical head 2 arrives above the sector $SC_{17}$ of the track $T_1$, the format control circuit 3 initiates data processing from the sector $SC_{17}$, and therefore, jump-back control is unnecessary. Therefore, the format control circuit 3 generates a jump-back off signal S2 as shown in FIG. 9A. As a result, data processing is initiated, so that the data processing signal S3 of the decoder 12 rises as shown in FIG. 9B. Also, when the data processing is abnormally completed, the data processing signal S3 of the decoder 12 falls as shown in FIG. 9B. In this case, the falling edge of the data processing signal S3 is detected by the falling edge detection circuit 1506, so that its detection signal S4 is generated as shown in FIG. 9C. As a result, as shown in FIG. 9D, the output signal S5 of the flip-flop 1507 remains active (="1") from a time when the jump-back off signal S2 is generated to a time when the data processing signal S3 falls. Therefore, the output signal S10 of the AND circuit 1505 as shown in FIG. 9E is not masked by the gate circuit 1508, so that the jump-back signal S6 is generated as shown in FIG. 9F. Thus, a jump-back control is carried out.

FIGS. 10A through 10F shown an abnormal data processing. In this case, a desired sector is accessed, but the data processing is incomplete at the last sector. Also, in this case, assume that the host computer 20 has generated a data processing instruction signal initiated at the sector $SC_{17}$ of the track $T_1$. Then, the microcomputer 7 controls the linear motor 10, so that the optical head 2 seeks the track $T_1$. Next, the format control circuit 3 searches the sector number "7". As a result, when the optical head 2 arrives above the sector $SC_{17}$ of the track $T_1$, the format control circuit 3 initiates data processing from the sector $SC_{17}$, and therefore, jump-back control is unnecessary. Therefore, the format control circuit 3 generates a jump-back off signal S2 as shown in FIG. 10A. As a result, data processing is initiated, so that the data processing signal S3 of the decoder 12 rises as shown in FIG. 10B. Also, when the data processing is abnormally completed at the sector $SC_{1,16}$, the data processing signal S3 of the decoder 12 falls as shown in FIG. 10B. In this case, the falling edge of the data processing signal S3 is detected by the falling edge detection circuit 1506, so that its detection signal S5 is generated as shown in FIG. 10C. As a result, as shown in FIG. 10D, the output signal S5 of the flip-flop 1507 remains active (="1") from a time when the jump-back off signal S2 is generated to a time when the data processing signal S3 falls. However, as shown in FIG. 10E, the output signal S10 of the AND circuit 1505 is already generated before the falling of the output signal S5 of the flip-flop 1507. Therefore, the output signal S10 of the AND circuit 1505 as shown in FIG. 10E is masked by the gate circuit 1508, so that the jump-back signal S6 is not generated as shown in FIG. 10F. Thus, a jump-back control is not carried out.

Thus, in the above-described optical information accessing system, when a desired sector is accessed but the data processing is incomplete at the last sector, jump-back control is not carried out. As a result, jump-back control has to be carried out twice after the completion of the seek of the next track.

Figure 11:
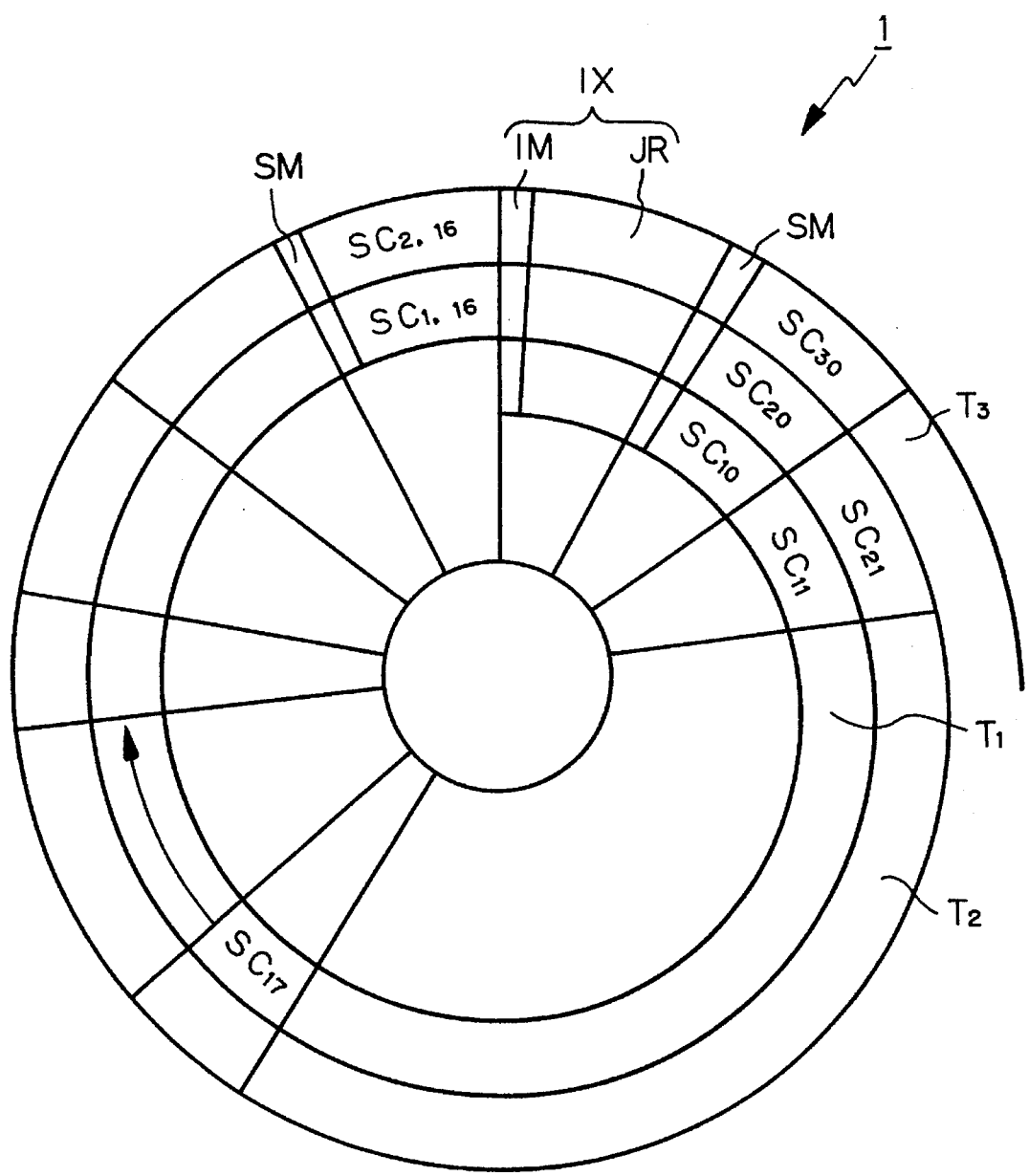
FIG. 11 is a diagram showing another example of the disc format of the optical disc.
Figure 12:
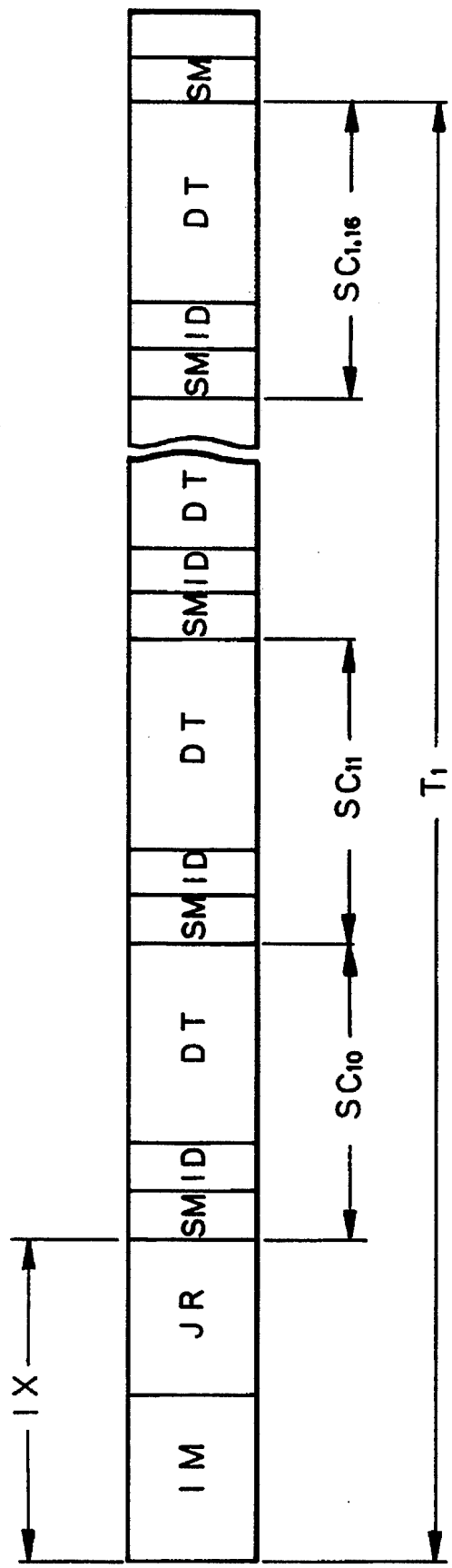
FIG. 12 is a diagram showing an example of the sector format of FIG. 11.

In order to carry out jump-back control even after the data processing is incomplete at a predetermined sector such that last sector, an index area IX formed by an index mark IM and a jumping area JR is provided at each of the tracks $T_1$, $T_2$, ..., as shown in FIGS. 11 and 12, and jump-back control is carried out in the jumping area JR (see: JP-A-SHO 60-115069). In this case, however, the index area IX occupies an area of each track corresponding to one sector, which reduces the data area of the tracks.

Figure 13:
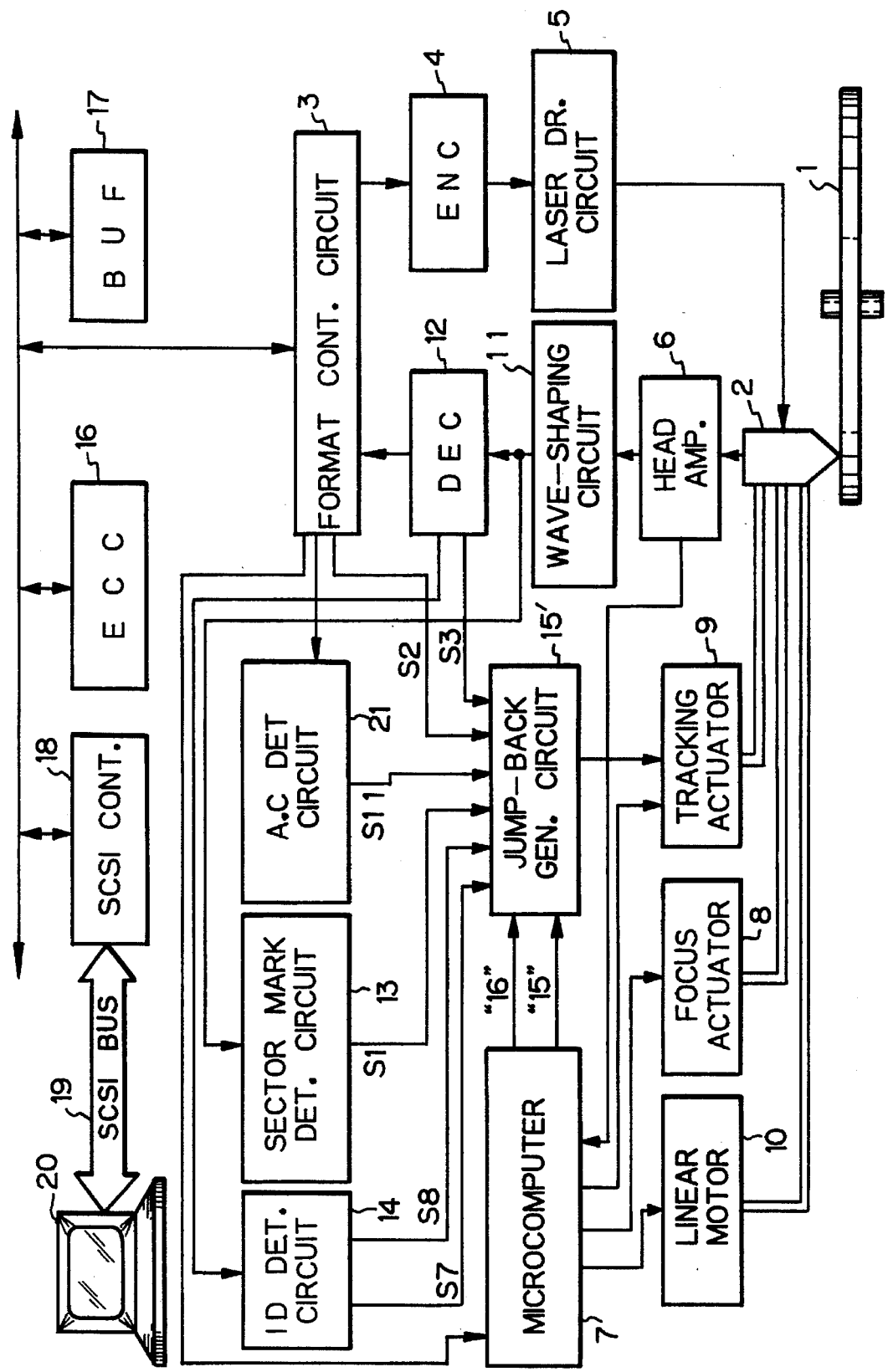
FIG. 13 is a block diagram illustrating a first embodiment of the optical information accessing system according to the present invention.

In FIG. 13, which illustrates a first embodiment of the present invention, a jump-back generating circuit 15' is provided instead of the jump-back generating circuit 15 of FIG. 1, and an abnormal completion detection circuit 21 for detecting an abnormal completion is added to the elements of FIG. 1. When the data processing is abnormally completed, the abnormal completion detection circuit 21 generates an abnormal completion detection signal S11 and transmits it to the jump-back generating circuit 15'.

Figure 14:
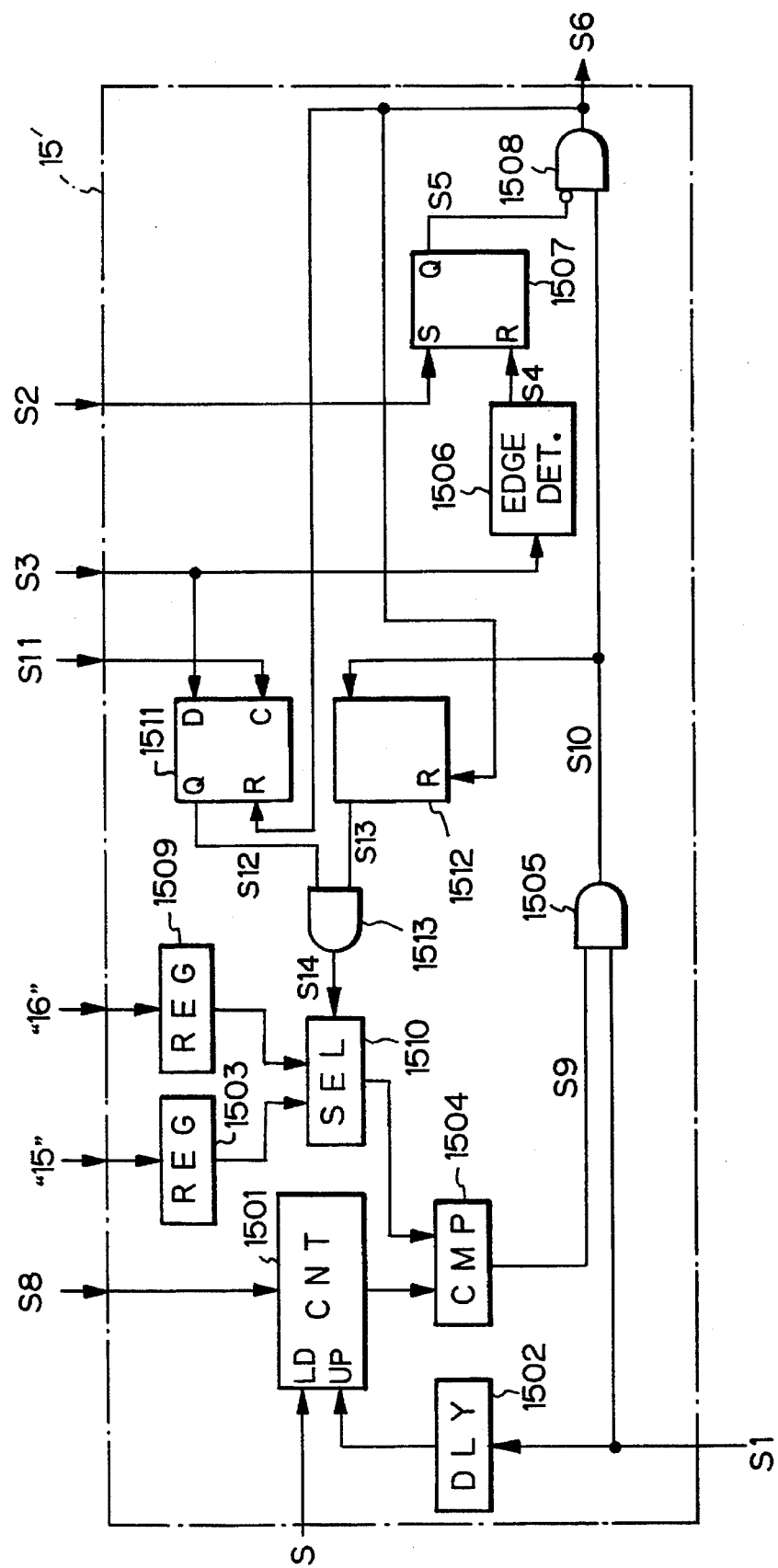
FIG. 14 is a detailed circuit diagram of the jump-back generating circuit of FIG. 13.

In FIG. 14, which is a detailed circuit diagram of the jump-back generating circuit 15' of FIG. 13, a register 1509, a selector 1510 for selecting one of the registers 1503 and 1509, a flip-flop 1511 for detecting an abnormal completion of the data processing, a latch circuit 1512 for latching the output signal S10 of the AND circuit 1505, and an AND circuit 1513 for controlling the selector 1510 based upon an AND logic between the outputs of the flip-flop 1511 and the latch circuit 1512 are added to the elements of FIG. 5.

A value "16" is set in the register 1509 by the microcomputer 7.

Also, when the output signal S14 of the AND circuit 1513 is low (="0"), the selector 1510 selects the register 1503, and therefore, the jump-back generating circuit 15' operates in the same as the jump-back generating circuit 15 of FIG. 5. On the other hand, when the output signal S14 of the AND circuit 1513 is high (="1"), the selector 1510 selects the register 1509.

In order to make the output signal S14 of the AND circuit 1513 high (="1"), the following two conditions have to be satisfied:

i) the output signal S12 of the flip-flop 1511 is "1"; and ii) the output signal S13 of the latch circuit 1512 is "1".

In other words, i) an abnormal completion detection signal S11 is generated while the data processing signal S3 is "1"; and ii) the output of the AND circuit 1505 is "1".

The above-described conditions correspond to a case where the data processing is abnormally completed at a predetermined sector (which is, in this case, the last sector) or thereafter.

Note that, in a normal data processing, the jump-back generating circuit 15' operates in the same way as the jump-back generating circuit 15 (see: FIGS. 7A through 7F); in a case where a desired sector cannot be accessed, the jump-back generating circuit 15' operates in the same way as the jump-back generating circuit 15 (see: FIGS. 8A through 8F); and in a case where a desired sector is accessed but the data processing is incomplete before the last sector, the jump-back generating circuit 15' operates in the same way as the jump-back generating circuit 15 (see: FIGS. 9A through 9F).

FIGS. 15A through 15L show an abnormal data processing where a desired sector is accessed, but the data processing is incomplete at the last sector.

Figure 15:
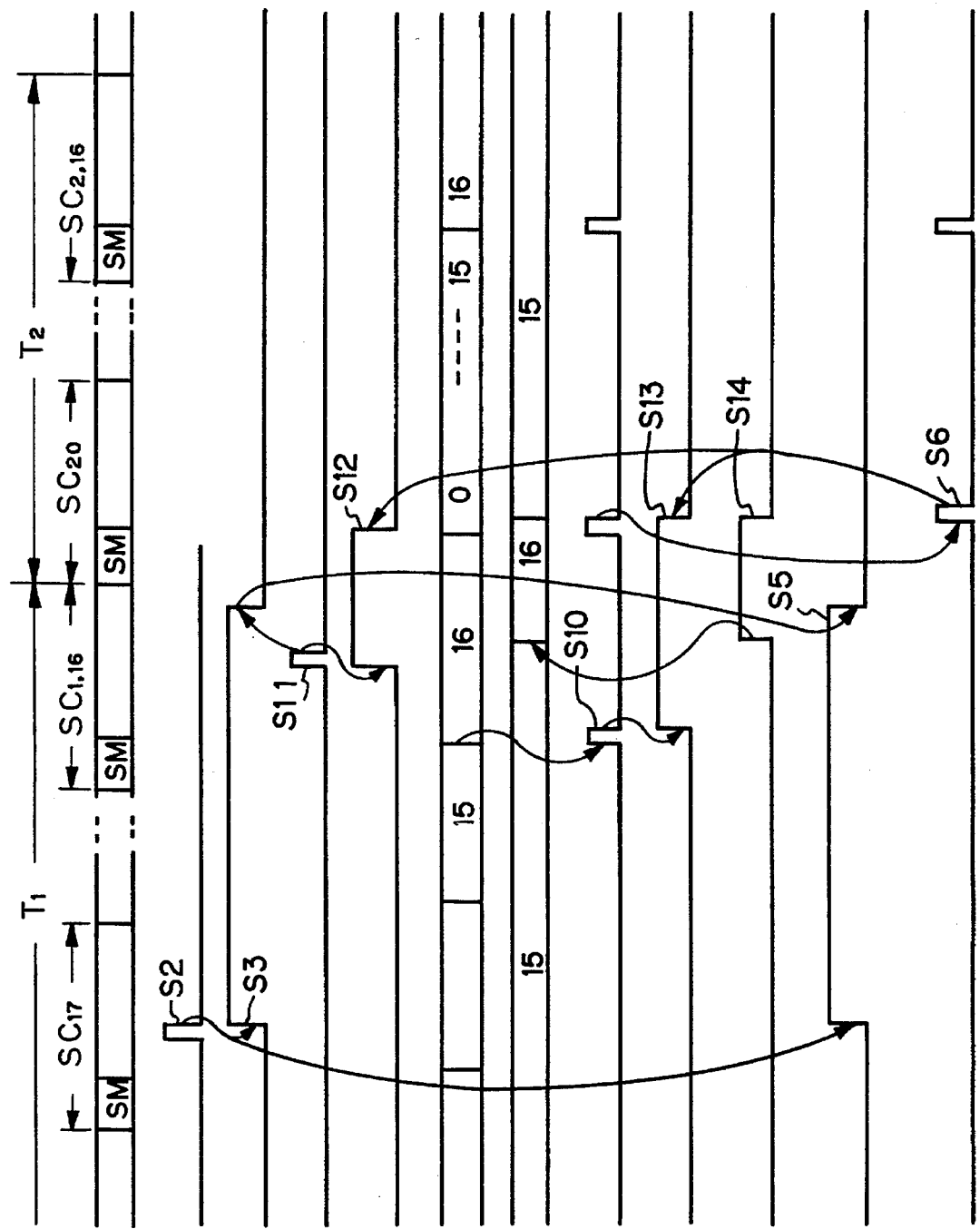
FIGS. 15A through 15L are timing diagrams showing the operation of the jump-back generating circuit of FIG. 14.

Note that the output signal S14 of the AND circuit 1513 is initially set at "0" as shown in FIG. 15J, and therefore, the selector 1510 selects the value "15" of the register 1503 as shown in FIG. 15G.

First, assume that the host computer 20 has generated a data processing instruction signal initiating at the sector $SC_{17}$ of the track $T_1$. Then, the microcomputer 7 controls the linear motor 10, so that the optical head 2 seeks the track $T_1$. As a result, the ID area information read out of the track $T_1$ having sectors $SC_{10}$, $SC_{11}$, . . . as shown in FIG. 15A is supplied via the decoder 12 to the ID determination circuit 14 which determines whether or not the track number, the sector number and the like included in the ID area of each sector are correct. Only when the ID information included in each sector is correct, does the ID determination circuit 14 generate an ID detection signal S7. As a result, the counter 1501 loads the sector number signal S8 in response to the ID detection signal S7. On the other hand, the counter 1501 is counted up by the delayed sector mark detection signal S1'. In any case, the current sector number is stored in the counter 1501 as shown in FIG. 15F. Next, the format control circuit 3 searches the sector number "7". As a result, when the optical head 2 arrives above the sector $SC_{17}$ of the track $T_1$, the format control circuit 3 initiates data processing from the sector $SC_{17}$, and therefore, jump-back control is unnecessary. Therefore, the format control circuit 3 generates a jump-back off signal S2 as shown in FIG. 15B. As a result, data processing is initiated so that the data processing signal S3 of the decoder 12 rises as shown in FIG. 15C.

Next, when the value of the counter 1501 reaches the value "15" of the register 1505, the comparator 1504 generates a coincidence signal S9. As a result, when the sector mark detection circuit 13 generates a sector mark detection signal S1 as shown in FIG. 15H, the output signal S10 of the AND circuit 1505 is made high (="1") as shown in FIG. 15H. On the other hand, as shown in FIG. 15K, the output signal S5 of the flip-flop 1507 is already set when the jump-back off signal S2 is generated as shown in FIG. 15B. Therefore, as shown in FIGS. 15H and 15L, the output signal S10 of the AND circuit 1305 is masked by the gate circuit 1508, so that the jump-back signal S6 is not generated. Thus, at this time, a jump-back control is not carried out.

However, as shown in FIGS. 15C and 15D, at the last sector $SC_{1,16}$, an abnormal completion detection signal S11 is generated while the data processing signal S3 is high (="1"). As a result, the flip-flop 1511 is set, so that its output S12 is made high (="1") as shown in FIG. 15E. Simultaneously, as shown in FIGS. 15H and 15L, the output signal S13 of the latch circuit 1512 is made high (="1") by the output signal S10 of the AND circuit 1505 which is not the jump-back signal S6. As a result, the output signal S14 of the AND circuit 1513 is switched from low to high as shown in FIG. 15J, and therefore, the selector 1510 selects the value "16" of the register 1509 as shown in FIG. 15G.

On the other hand, since the abnormal completion detection signal S11 is generated, the format control circuit 3 resets the data processing signal S3 as shown in FIG. 15C. Therefore, as shown in FIG. 15K, the flip-flop 1307 is also reset to change its output signal S5 from high to low.

In the above-described state, when the value of the counter 1503 reaches the value "16" of the register 1509, the output signal S9 of the comparator 1504 is again made active (="1"). As a result, the output signal S10 of the AND circuit 1505 is again made "1" as shown in FIG. 15H, in synchronization with the next sector mark detection signal S1 of the sector mark detection circuit 13. At this time, since the output signal S5 of the flip-flop 1507 is low as shown in FIG. 15K, the second output signal S10 of the AND circuit 1505 passes the gate circuit 1508 as the jump-back signal S6. Thus, a jump-back control is carried out.

Note that the generation of the jump-back signal S6 resets the flip-flop 1514 and the latch circuit 1512 as shown in FIGS. 15E and 15I. As a result, the output signal S14 of the AND circuit 1514 is switched from high to low as shown in FIG. 15J, so that the selector 1510 again selects the value "15" of the register 1503.

Thus, according to the first embodiment, when the data processing is abnormally completed at the last sector, a jump-back control is carried out at the next sector which is, in this case, the first sector of the next track.

Figure 16:
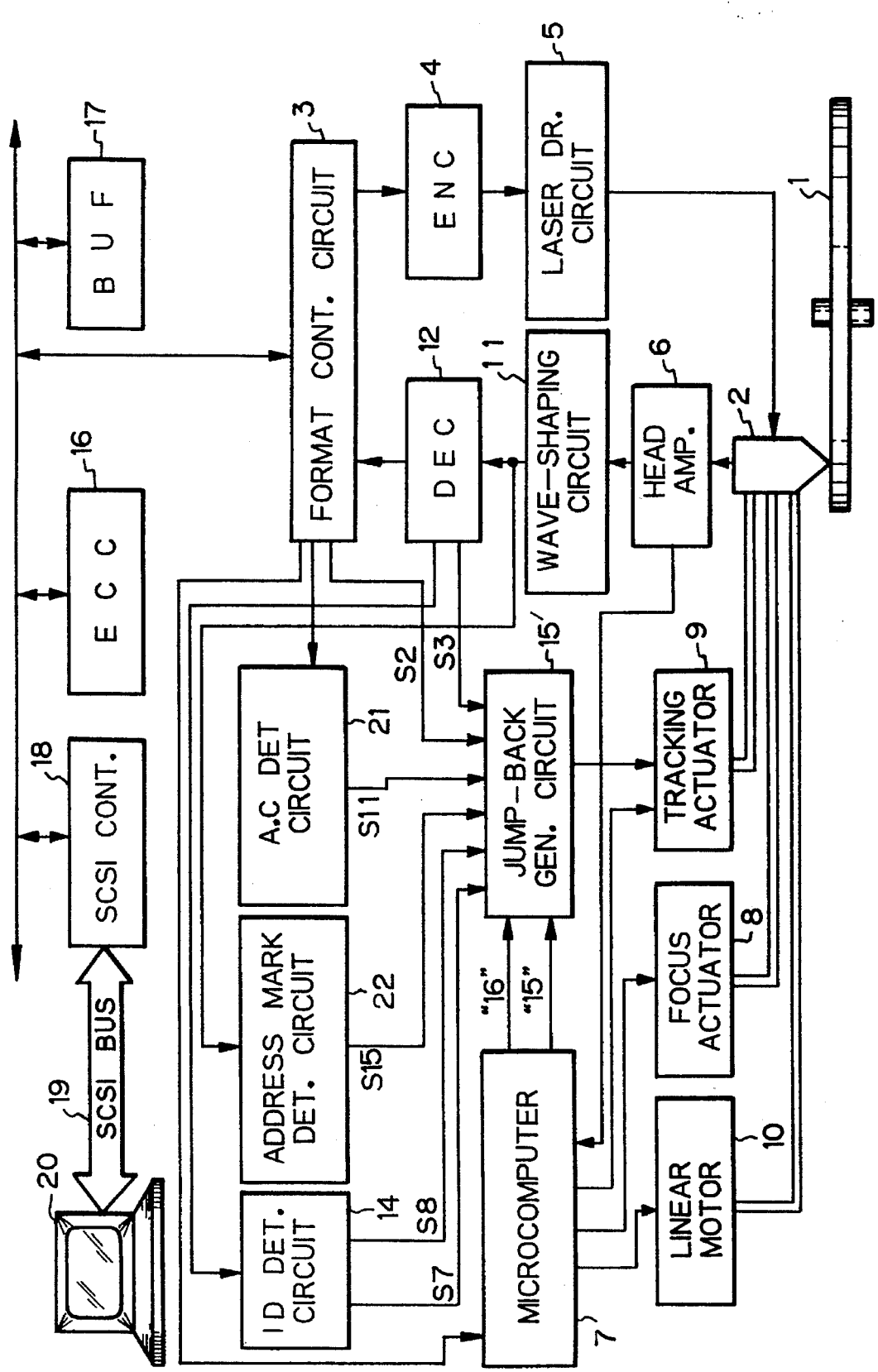
FIG. 16 is a block diagram illustrating a second embodiment of the optical information accessing system according to the present invention.

In FIG. 16, which illustrates a second embodiment of the present invention, an address mark detection circuit 22 is provided instead of the sector mark detection circuit 13 of FIG. 13. The address mark detection circuit 22 detects the first address mark AM included in each of the sectors as shown in FIG. 4. Therefore, the output signal S15 of the address mark detection circuit 22 serves as the output signal S1 of the sector mark detection circuit 13 of FIG. 13.

Figure 17:
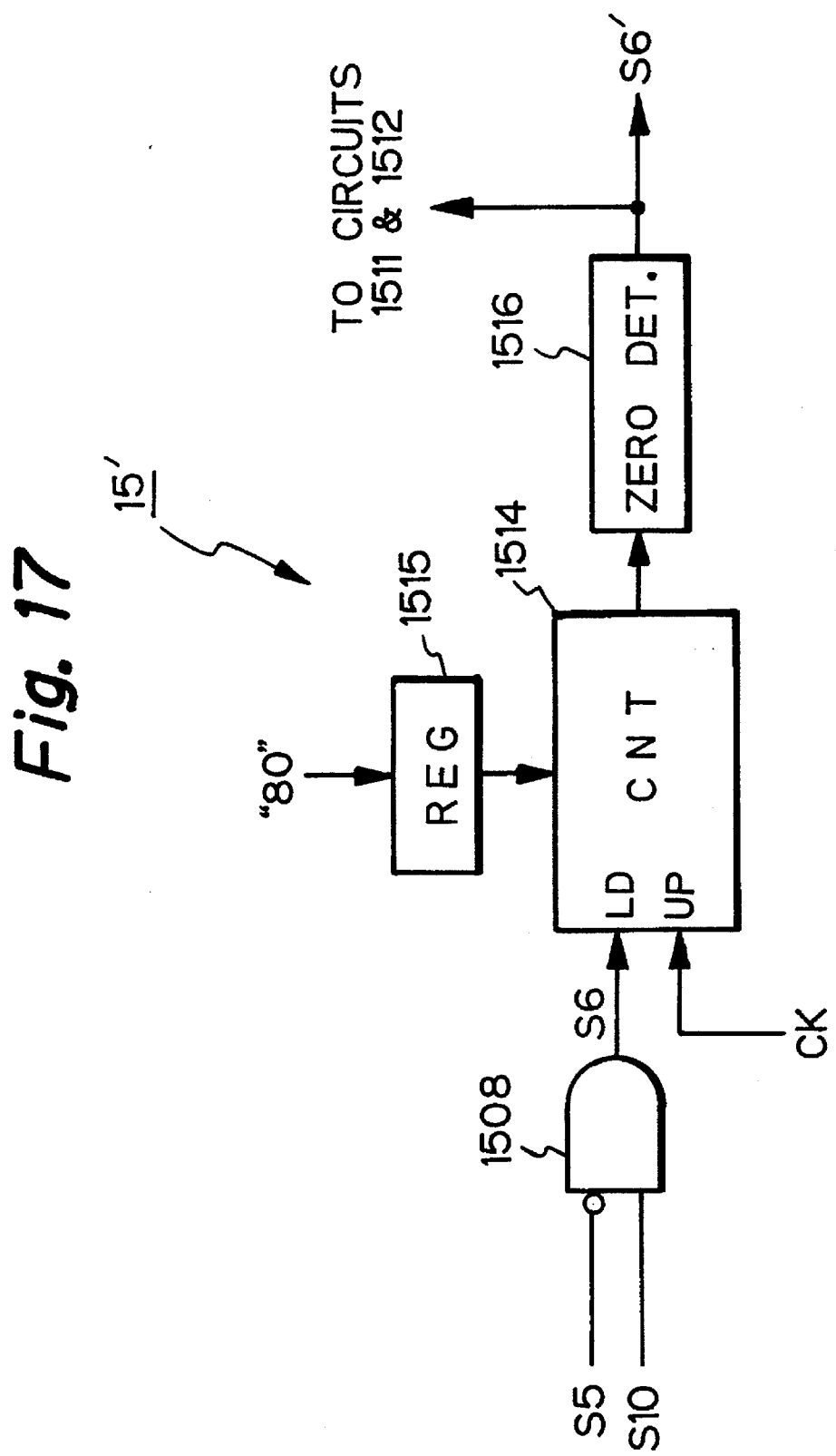
FIG. 17 is detailed circuit diagram of the jump-back generating circuit of FIG. 16.

In FIG. 17, which is a modification of the jump-back generating circuit 15' of FIG. 14, a counter 1514, a register 1515 and a zero detection circuit 1516 are added to the elements of FIG. 14, thus changing the timing of generation of a jump-back signal S6'. A predetermined value is loaded in the register 1515 by the microcomputer 7. Also, CK is a clock signal in synchronization with each 1 byte data of the optical disc 1, and is supplied from the wave-shaping circuit 11. That is, in FIG. 2, the timing of the jump-back signal S6 is the same as that of the output signal S10 of the AND circuit 1505. Contrary to this, in FIG. 17, the timing of the jump-back signal S6' is delayed by the predetermined number of bytes as compared with the timing of the output signal S10 of the AND circuit 1505.

Figures 18A, 18B, 18C, 18D, 18E:
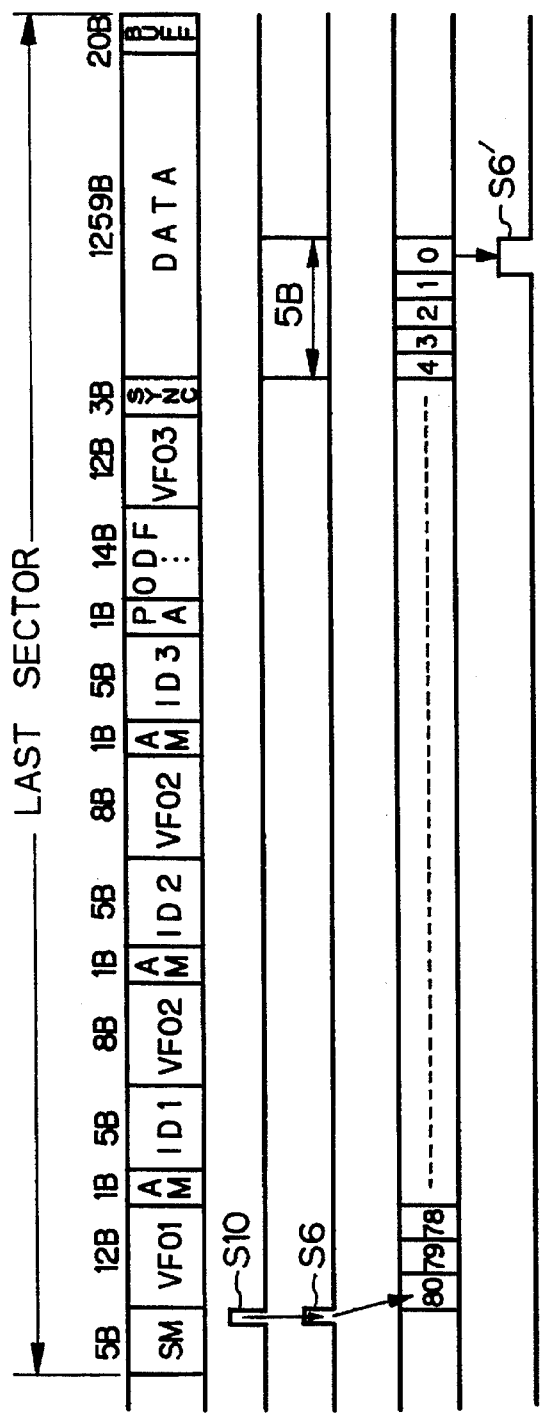
FIGS. 18A through 18E are timing diagrams showing the operation of the jump-back generating circuit of FIG. 17.

The operation of the jump-back generating circuit 15' of FIG. 17 is explained next with reference to FIGS. 18A through 18E. Assume that the jump-back signal S6' is generated at the fifth byte of the data area of the last sector as shown in FIG. 18A. In this case, the microcomputer 7 sets "80" in the register 1515. Next, the output signal S10 of the AND circuit 1505 is generated as shown in FIG. 18B, and therefore, the output signal S6 of the AND circuit 1508 is generated as shown in FIG. 18C. As a result, the value "80" is set in the counter 1515, and then the value of the counter 1515 is counted down in accordance with the clock signal CK as shown in FIG. 18D. Finally, when the value of the counter 1514 reaches "0", the zero detection circuit 1516 generates the jump-back signal S6' as shown in FIG. 18E.

Thus, in the jump-back generating circuit 15' of FIG. 17, a number of bytes from when the sector mark is detected to a desired timing, is set in the register 1515, thus changing the timing of generation of the jump-back signal.

As explained hereinbefore, according to the present invention, even when data processing is abnormally interrupted at the special sector such as the last sector of each track, a jump-back operation can be carried out immediately after the data processing is interrupted.

We claim:

1. An optical information accessing system for a disc-type recording medium including a plurality of tracks forming one helix, each track having a plurality of sectors, comprising:

a counter for counting said sectors by tracing each of said tracks;

a comparator, connected to said counter, for comparing a value of said counter with a first value, to generate a coincidence signal when the value of said counter is the same as said first value;

abnormal completion signal generating means for generating an abnormal completion signal when data processing performed upon said disc-type recording medium is abnormally interrupted;

changing means, connected to said abnormal completion signal generating means and said comparator, for changing said first value with a second value different from said first value, when said abnormal completion signal is generated and said coincidence signal is generated;

gate means for passing said coincidence signal therethrough as a jump-back control signal; and closing means, connected to said gate means, for closing said gate means when data processing is being performed upon said disc-type recording medium, thereby retracing said tracks based upon said jump-back signal.

2. A system as set forth in claim 1, wherein said counter counts said sectors by counting sector marks included in said tracks.

3. A system as set forth in claim 1, wherein said counter counts said sectors by counting first address marks included in said tracks.

4. A system as set forth in claim 1, further comprising delay means, connected to said gate means, for delaying said coincidence signal.

5. A system as set forth in claim 4, wherein said delay means comprises:

an additional counter, connected to said gate means, for counting a clock signal, said additional counter being initiated by an output signal of said gate means; and a detection circuit, connected to said additional counter, for detecting that a value of said additional counter has reached a certain value, thereby generating said jump-back signal in accordance with an output signal of said detection circuit.

6. A system as set forth in claim 1, wherein said second value is larger than said first value.

7. An optical information accessing system for a disc-type recording medium including a plurality of tracks forming one helix, each track having a plurality of sectors, comprising:

a counter for counting said sectors by tracing each of said tracks;

first storing means for storing a first value;

second storing means for storing a second value larger than said first value;

a selector, connected to said first and second storing means, for selecting one of said first and second storing means;

comparing means, connected to said counter and said selector, for comparing a value of said counter with a value of one of said first and second storing means selected by said selector, to generate a coincidence signal when the value of said counter is the same as the value of one of said first and second storing means selected by said selector;

selector control means, connected to said selector, for making said selector select said second storing means when data processing performed upon said disc-type recording medium is abnormally interrupted and said coincidence signal is generated;

gate means for passing said coincidence signal therethrough as a jump-back control signal; and closing means, connected to said gate means, for closing said gate means when data processing is being performed upon said disc-type recording medium, thereby retracing said tracks based upon said jump-back signal.

8. A system as set forth in claim 7, wherein said counter counts said sectors by counting sector marks included in said tracks.

9. A system as set forth in claim 7, wherein said counter counts said sectors by counting first address marks included in said tracks.

10. A system as set forth in claim 7, further comprising delay means, connected to said gate means, for delaying said coincidence signal.

11. A system as set forth in claim 10, wherein said delay means comprises:

an additional counter, connected to said gate means, for counting a clock signal, said additional counter being initiated by an output signal of said gate means; and a detection circuit, connected to said additional counter, for detecting that a value of said additional counter has reached a certain value, thereby generating said jump-back signal in accordance with an output signal of said detection circuit.

12. An optical information accessing system for a disc-type recording medium including a plurality of tracks forming one helix, each track having a plurality of sectors, comprising:

a counter count said sectors by tracing each of said tracks;

a comparator, connected to said counter, to compare a value of said counter with a first value, to generate a coincidence signal when the value of said counter is the same as said first value;

an address mark detection circuit to generate an abnormal completion signal when data processing performed upon said disc-type recording medium is abnormally interrupted;

a changing circuit, connected to said address mark detection circuit and said comparator, to change said first value with a second value different from said first value, when said abnormal completion signal is generated and said coincidence signal is generated;

a gate circuit to pass said coincidence signal therethrough as a jump-back control signal; and a closing circuit, connected to said gate circuit, to close said gate circuit when data processing is being performed upon said disc-type recording medium, thereby retracing said tracks based upon said jump-back signal.

13. An optical information accessing system for a disc-type recording medium including a plurality of tracks forming one helix, each track having a plurality of sectors, comprising:

a counter to count said sectors by tracing each of said tracks;

a first storing device to store a first value;

a second storing device to store a second value larger than said first value;

a selector, connected to said first and second storing devices, to select one of said first and second storing devices;

a comparator, connected to said counter and said selector, to compare a value of said counter with a value of one of said first and second storing devices selected by said selector, to generate a coincidence signal when the value of said counter is the same as the value of one of said first and second storing devices selected by said selector;

a selector control circuit, connected to said selector, to make said selector select said second device when data processing performed upon said disc-type recording medium is abnormally interrupted and said coincidence signal is generated;

a gate circuit to pass said coincidence signal therethrough as a jump-back control signal; and a closing circuit, connected to said gate circuit, to close said gate circuit when data processing is being performed upon said disc-type recording medium, thereby retracing said tracks based upon said jump-back signal.

* * * * *